United States Patent
Hirata

(10) Patent No.: US 9,436,303 B2
(45) Date of Patent: Sep. 6, 2016

(54) INPUT DEVICE CONTROL APPARATUS AND INPUT DEVICE CONTROL METHOD

(71) Applicant: Sony Computer Entertainment Inc., Tokyo (JP)

(72) Inventor: Shinichi Hirata, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 300 days.

(21) Appl. No.: 13/948,747

(22) Filed: Jul. 23, 2013

(65) Prior Publication Data

US 2014/0028593 A1 Jan. 30, 2014

(30) Foreign Application Priority Data

Jul. 26, 2012 (JP) ................................. 2012-166305

(51) Int. Cl.
*G06F 3/041* (2006.01)

(52) U.S. Cl.
CPC ............. *G06F 3/041* (2013.01); *G06F 3/0414* (2013.01); *G06F 3/0416* (2013.01); *G06F 2203/04104* (2013.01); *G06F 2203/04105* (2013.01)

(58) Field of Classification Search
CPC .... G06F 3/0414; G06F 3/0487; G06F 3/041; G06F 3/0416; G06F 2203/04105; G06F 2203/04104
USPC .................................................. 345/173–178
See application file for complete search history.

(56) References Cited

U.S. PATENT DOCUMENTS

| 7,053,868 | B1 | 5/2006 | Kojima |
| 7,307,622 | B2 | 12/2007 | Uchiyama |
| 2001/0017617 | A1 | 8/2001 | Uchiyama |
| 2007/0137901 | A1* | 6/2007 | Chen ..................... G06F 3/0414 178/18.01 |
| 2009/0303194 | A1* | 12/2009 | Kumamoto .................... 345/173 |
| 2010/0002008 | A1 | 1/2010 | Tsuzaki |
| 2011/0032199 | A1* | 2/2011 | Seo et al. ....................... 345/173 |

FOREIGN PATENT DOCUMENTS

| CN | 101421690 | | 4/2009 |
| JP | 06-301462 | A | 10/1994 |
| JP | 07-084721 | A | 3/1995 |
| JP | 2001092409 | A | 4/2001 |
| JP | 2001228964 | A | 8/2001 |
| JP | 2004309858 | A | 11/2004 |
| JP | 2010-015485 | A | 1/2010 |
| JP | 2010-026064 | A | 2/2010 |
| JP | 2010257012 | A | 11/2010 |

OTHER PUBLICATIONS

Office Action for corresponding JP Application No.: No. 2012-166305, dated Apr. 22, 2014.
Office Action for corresponding CN Application No.: No. 201310317697.0, 8 pages, dated Dec. 2, 2015.

* cited by examiner

*Primary Examiner* — Amit Chatly
(74) *Attorney, Agent, or Firm* — Matthew B. Dernier, Esq

(57) ABSTRACT

A conversion unit converts output data detected by an input device based on any one type of conversion table among a plurality of types of conversion tables. An output unit transmits the output data thus converted to a main processor via an interface. A switching unit receives, from the main processor via the interface, a mode switching signal for switching detection sensitivity. The conversion unit switches the conversion table for reference based on the mode switching signal. The conversion table is a bit conversion table for reducing the number of bits of the output data.

6 Claims, 7 Drawing Sheets

INPUT DEVICE CONTROL APPARATUS AND INPUT DEVICE CONTROL METHOD

BACKGROUND OF THE INVENTION

1. Field of the Invention

The present invention relates to an input device control apparatus and an input device control method for converting output data detected by an input device.

2. Description of the Related Art

Interface devices such as touchpanels and touch pads that allow a person to enter input by touching a display screen directly with his/her finger are widely used in personal computers, various types of portable devices, mobile phones, and the like. In recent years, devices have been introduced that can acquire attribute information concerning a touch point such as the strength (pressure) of a touch, the direction of a finger, and the like in addition to the coordinates of the touch point.

Patent document No. 1 discloses a portable image display apparatus provided with display screens on both sides thereof.

[Patent document No. 1] Japanese Patent Application Publication No. 2010-26064

In the case of a touch input device such as a touchpanel, a touch pad, a grip sensor, and the like that is touched by a user using a hand or the like, it is necessary to transmit sensing data of the entire contact surface from the touch input device to a main processor. Therefore, a problem arises where the amount of data that is transferred becomes large, requiring a wide transmission bandwidth and increasing power consumption. Requirements for detection sensitivity of a touch input device sometimes vary depending on applications. Thus, it is also necessary to change pressure sensitivity based on the needs of applications.

SUMMARY OF THE INVENTION

In this background, a purpose of the present invention is to provide a technology capable of converting output data of a sensor so as to reduce the amount of data that is transferred. Another purpose is to provide a technology capable of adjusting detection sensitivity of a sensor.

An input device control apparatus according to one embodiment of the present invention includes: a conversion unit configured to convert output data detected by an input device based on any one type of conversion table among a plurality of types of conversion tables; an output unit configured to transmit the output data thus converted to a main processor via an interface; and a switching unit configured to receive, from the main processor via the interface, a mode switching signal for switching detection sensitivity. The conversion unit switches the conversion table for reference based on the mode switching signal.

Another embodiment of the present invention relates to an input device control method. This methods includes: converting output data detected by an input device based on any one type of conversion table among a plurality of types of conversion tables; transmitting the output data thus converted to a main processor via an interface, thereby outputting the output data; and receiving, from the main processor via the interface, a mode switching signal for switching detection sensitivity. In the converting, the conversion table for reference is switched based on the mode switching signal.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
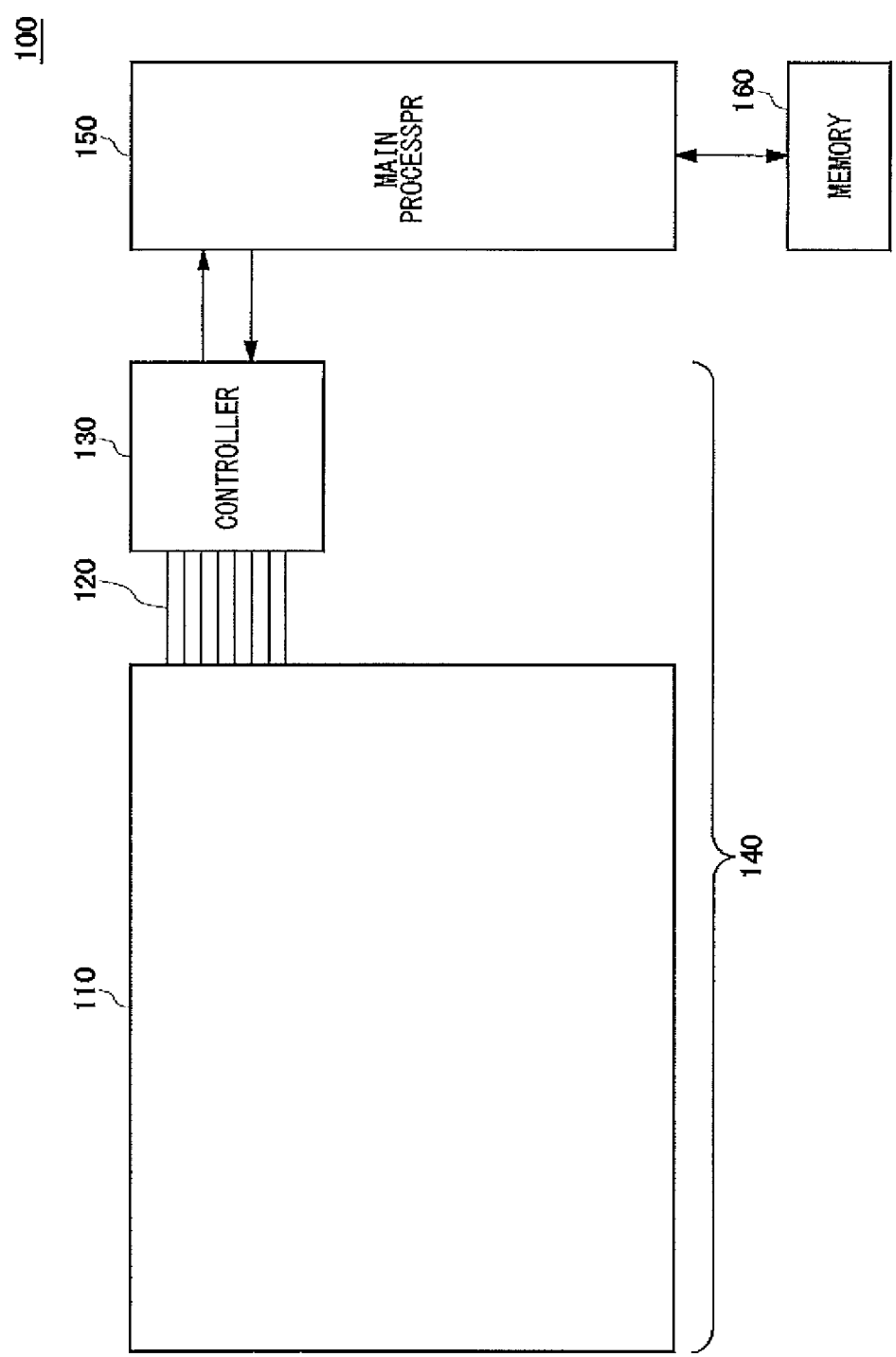
FIG. 1 is a diagram illustrating the configuration of a touch input processing apparatus according to an embodiment.

FIG. 1 is a diagram illustrating the configuration of a touch input processing apparatus 100 according to an embodiment. As an example, a part of or the entire functional configuration of the touch input processing apparatus 100 shown in FIG. 1 can be implemented in a personal computer, a game device, a portable device, a portable terminal, or the like by hardware, software, or a combination of both.

The touch input processing apparatus 100 includes a touch input device unit 140, a main processor 150, and a memory 160. The touch input device unit 140 includes a touch input device 110 and a touch input device controller 130 connected to the touch input device 110 via a flexible substrate 120.

The touch input device 110 is an input apparatus for detecting, by various methods, a contact point (position) by a finger or the like (hereinafter referred to as a "touch point (position)") and a detection quantity (hereinafter referred to as a "touch state quantity") of electrostatic capacitance, electrical resistance, and the like that show the condition of contact at the touch point (position).

An example of the touch input device 110 is a touchpanel. A tough panel is a transparent panel device and is provided on a display apparatus such as a liquid crystal display, an organic EL (electroluminescence) display, etc. This allows the user to enter, while viewing a screen of a display, an operation into the screen by touching a touchpanel directly with a finger. Another example of the touch input device 110 is a touch pad. A touch pad is an opaque touch input device and is not provided with a display.

A method for detecting a touch point and a touch state quantity in the touch input device 110 includes capacitive type and resistive type. In the case of the capacitive type, the touch input device controller 130 measures an amount of change in electrostatic capacitance at each point of the touch input device 110 and detects the position of a touch point and the value of electrostatic capacitance at the touch point. In the case of the resistive type, the touch input device controller 130 measures an amount of change in pressure at each point of the touch input device 110 and detects the position of a touch point and the value of pressure at the touch point.

An example of a resistive type touch pad includes a PET film on which a special pressure-sensitive material is printed. This allows for measurement of pressure in a wide dynamic range including a touch with slight pressure, such as a "light touch," where contact is barely made as if touched by a feather and a touch with a high pressing force where contact is made while putting strength into the tip of a finger.

In the present embodiment, an explanation is given regarding an exemplary embodiment designed for a touch input device 110 of resistive type. A method for converting output data of a sensor according to the present embodiment can be applied to a touch input device 110 of any method regardless of whether the device is of capacitive type or resistive type. The method for converting output data of a sensor according to the present embodiment can be applied not only to a touchpanel and a touch pad but also to any sensing device as long as the sensing device is a touch input device, such as a grip sensor, to which a user enters some sort of input by a touch of a hand or the like.

The main processor 150 acquires time-series data on the position of a touch point and on a state quantity detected by the touch input device controller 130 and reads and writes the data from and to the memory 160.

Figure 2:
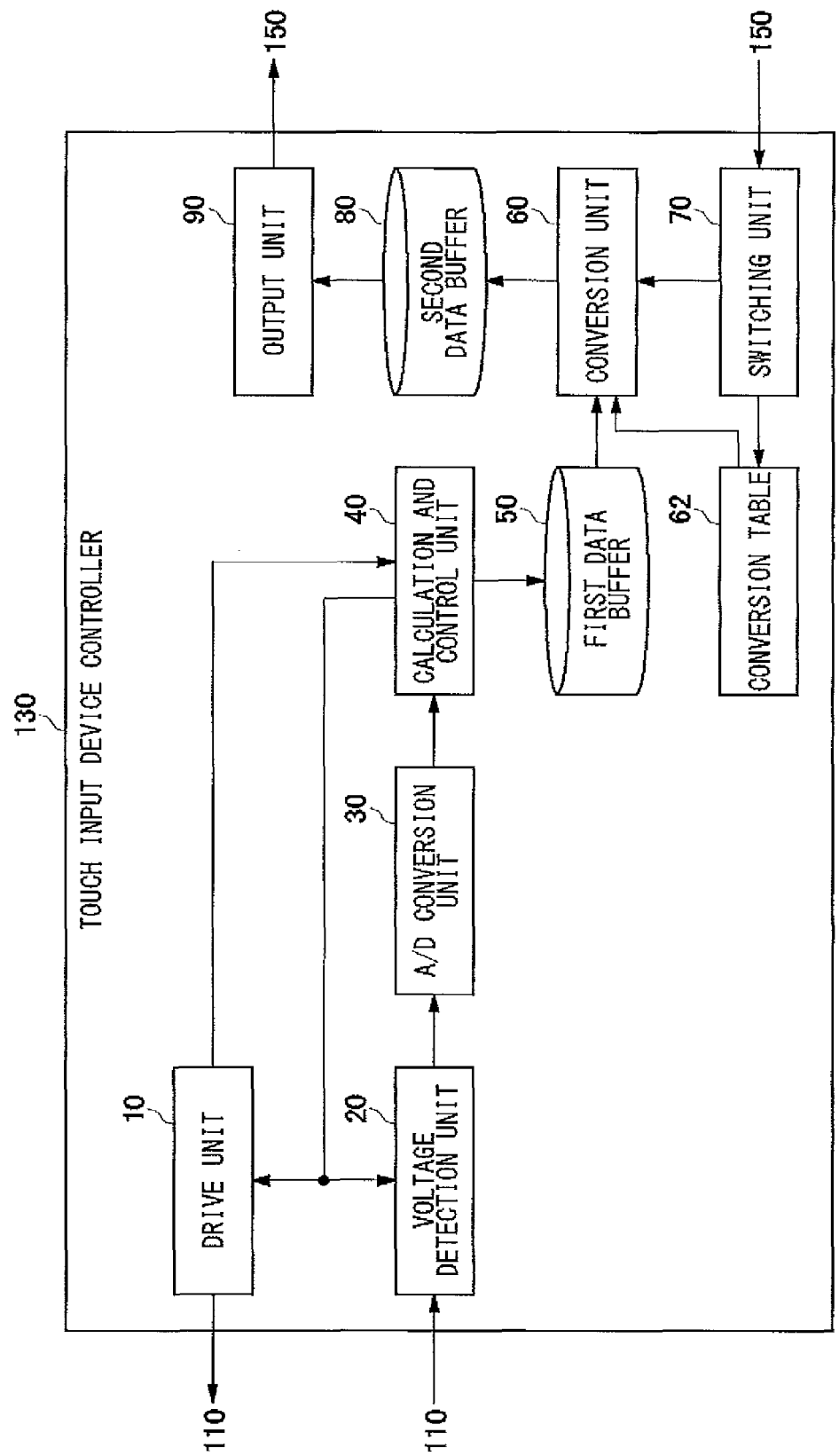
FIG. 2 is a diagram of the functional configuration of a touch input device controller shown in FIG. 1.

FIG. 2 is a diagram of the functional configuration of the touch input device controller 130. The touch input device controller 130 includes a drive unit 10, a voltage detection unit 20, an A/D conversion unit 30, a calculation and control unit 40, a first data buffer 50, a conversion unit 60, a conversion table 62, a switching unit 70, a second data buffer 80, and an output unit 90.

The drive unit 10 provides a drive voltage to a drive line of the touch input device 110, and the voltage detection unit 20 detects an output voltage on a sensing line of the touch input device 110. The A/D conversion unit 30 analog-to-digital (A/D) converts the detected output voltage.

The calculation and control unit 40 obtains a resistance value of a pressure sensing resistor provided at a part where a drive line and a sensing line intersect with each other based on the drive voltage and the output voltage, obtains a pressure applied to the pressure sensing resistor based on the property of the pressure sensing resistor, and stores the resistance value and the pressure in the first data buffer 50. The calculation and control unit 40 controls timing at which the drive unit 10 drives the drive line and timing at which the voltage detection unit 20 scans the sensing line.

The switching unit 70 receives a mode switching signal from the main processor 150 and provides the mode switching signal to the conversion unit 60. A plurality of types of conversion tables 62 that show correction curves having different pressure sensitivity are stored in the memory in the touch input device controller 130. According to the mode switching signal, the conversion unit 60 switches a conversion table 62 to be selected. The switching unit 70 may receive data on a new conversion table 62 directly from the main processor 150 and rewrite an old conversion table 62 that already exists.

The conversion unit 60 reads data on a pressure f from the first data buffer 50, converts the data on the pressure f in accordance with a conversion table 62 specified by the switching unit 70, and stores the data on the pressure f as converted in the second data buffer 80. The output unit 90 reads, from the second data buffer 80, data on a pressure f as converted at each intersection of a drive line and a sensing line and transmits the data to the main processor 150.

Figure 3:
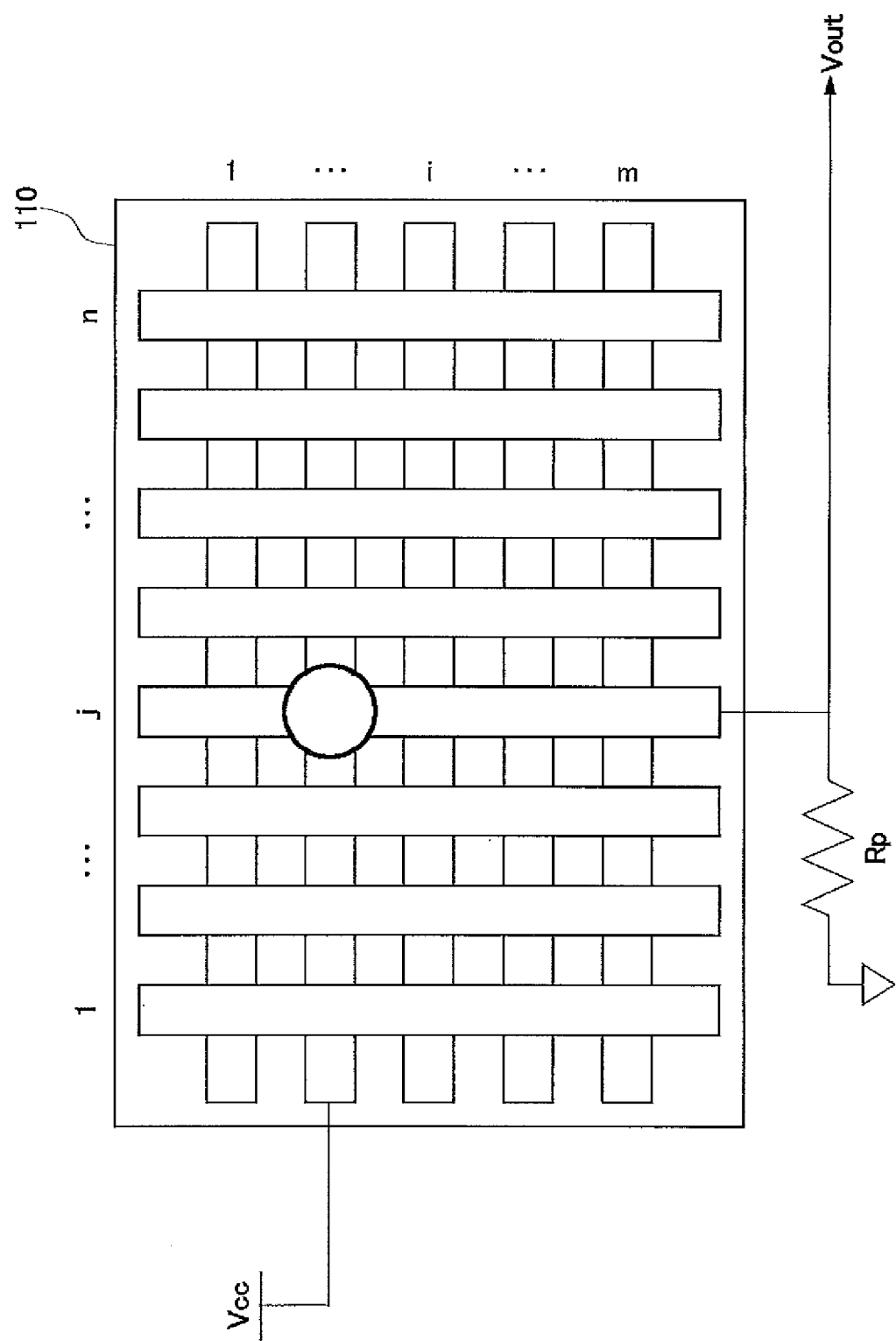
FIG. 3 is a diagram explaining the internal structure of a touch input device shown in FIG. 1.

FIG. 3 is a diagram explaining the internal structure of the touch input device 110. As shown in the figure, in a projection-type multi-touchpanel of resistive type, strip-shaped conductor lines are arranged in the horizontal and vertical directions, and pressure sensing resistors are applied at respective intersections of conductor lines. The conductor lines are formed of materials such as silver, copper, carbon, and the like. The pressure sensing resistors are materials whose resistance value changes considerably by a pressure that is applied.

Represented as drive lines that apply voltage are m conductor lines (horizontal lines) arranged in the horizontal direction of the touch input device 110. Represented as sensing lines that read voltage values are n conductor lines (vertical lines) arranged in the vertical line.

The drive unit 10 applies a drive voltage Vcc to an i-th drive line among the m drive lines, and the voltage detection unit 20 detects an output voltage Vout on a j-th sensing line among the n sensing lines. The A/D conversion unit 30 analog-to-digital converts the output voltage Vout that has been detected. The calculation and control unit 40 obtains a resistance value R of a pressure sensing resistor at an intersection (i,j) of the i-th drive line and the j-th sensing line based on the drive voltage Vcc and the output voltage Vout.

The resistance value R of the pressure sensing resistor at the intersection (i,j) desired to be sensed is a function of an applied pressure f. Thus, when the resistance value is written as R(f), the output voltage Vout is expressed in the following expression using the drive voltage Vcc and the resistance value R(f) of the pressure sensing resistor at the intersection.

$$Vout = Vcc \times Rp/(R(f)+Rp) \quad (1)$$

Rp represents a pull-down resistor Rp connected to each sensing line. This achieves an effect of stabilizing the voltage value of a sensing line, when the intersection is not being touched, at zero volt. The value of the pull-down resistor Rp is set in accordance with a variation range of the resistance value of the pressure sensing resistor. The pull-down resistor Rp is set to be larger than the maximum value of R(f) desired to be detected. For example, it is a common practice to set the pull-down resistor Rp to be from 1 kΩ to 100 kΩ.

When the intersection is not being touched, R(f) tends to infinity, and Vout thus tends to zero. When the intersection is being strongly touched, R(f) tends to zero, and Vout thus tends to Vcc.

The following expression (2) is obtained when the above expression (1) is solved for R(f).

$$R(f) = Rp \times (Vcc - Vout)/Vout \quad (2)$$

With this, the resistance value R(f) of the pressure sensing resistor at the intersection can be obtained as long as the output voltage Vout is detected under the drive voltage Vcc.

By measuring the output voltage Vout while switching drive lines and sensing lines sequentially, respective resistance values R(f) of pressure sensing resistors at all intersections can be obtained. If there are m drive lines and n sensing lines, the detection of an output voltage and analog-to-digital conversion are performed for (m×n) times.

Figure 4:
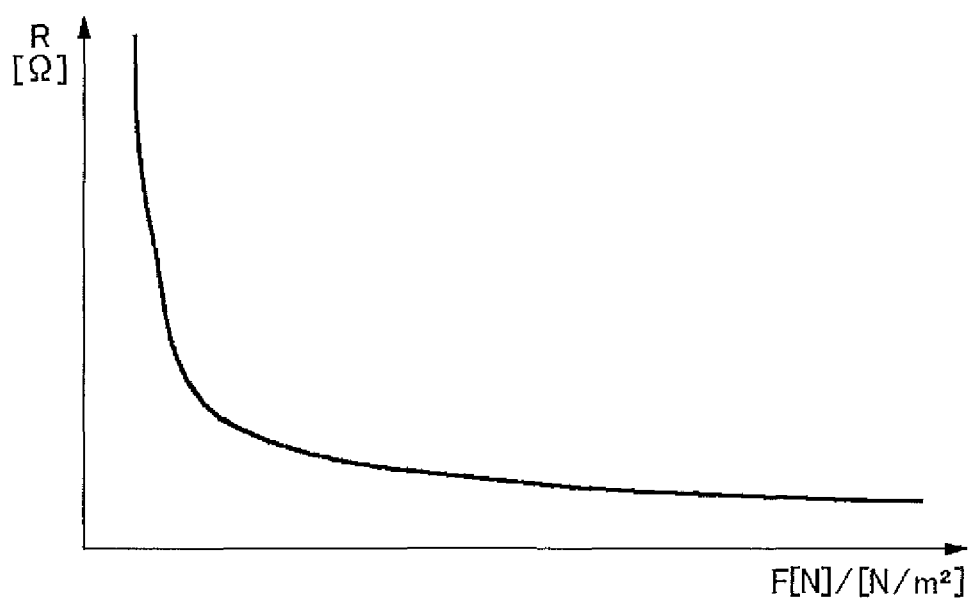
FIG. 4 is a graph illustrating a relationship between pressure applied to a pressure sensing resistor and a resistance value of the pressure sensing resistor.

FIG. 4 is a graph illustrating a relationship between a pressure f applied to a pressure sensing resistor and a resistance value R of the pressure sensing resistor. The unit of the pressure f is $N/m^2$, and the unit of the resistance value R is Ω. Instead of pressure, force whose unit is N may be used. An f-R curve is generally a monotonic decline curve such as the one shown in the figure, and a resistance value becomes smaller as pressure becomes larger. The degree and shape of the curve vary depending on the material of the pressure sensing resistor. A graph, which is arranged in a table, that shows an f-R property of the pressure sensing resistor is stored in the first data buffer 50.

The calculation and control unit 40 obtains a pressure f that corresponds to the resistance value R of the pressure sensing resistor based on the graph or the table that show the f-R property of the pressure sensing resistor and stores, in the first data buffer 50, the pressure f at the intersection that has been sensed. If the pressure f is zero or is equal to or higher than a predetermined threshold value, it can be considered that the intersection is being touched.

Figure 5:
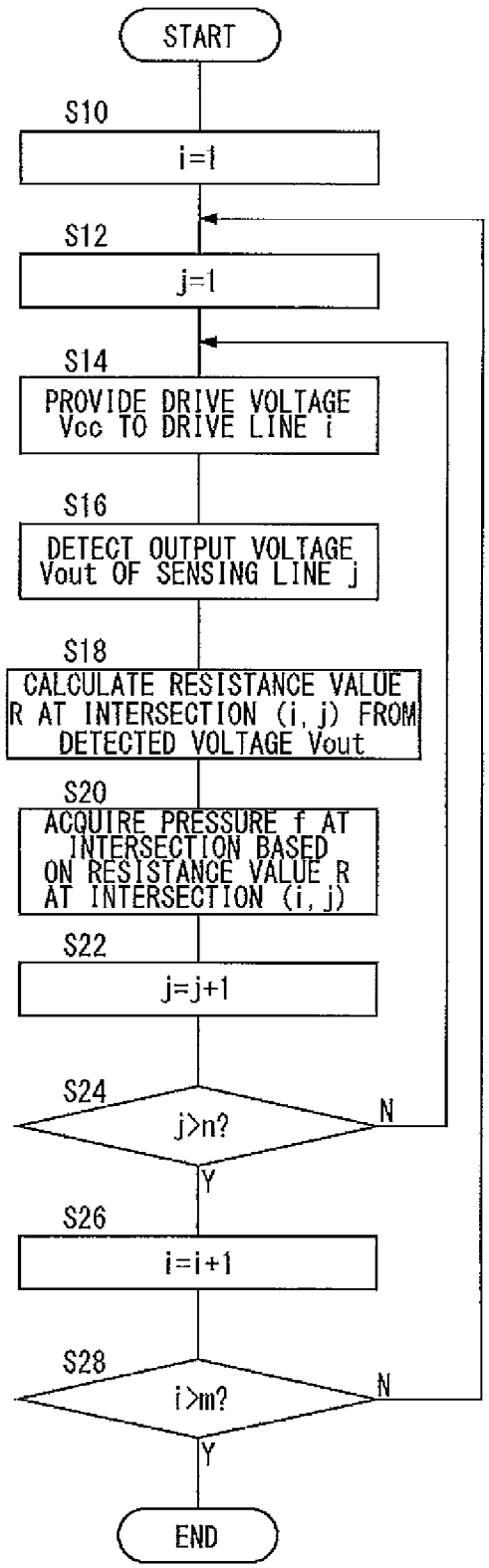
FIG. 5 is a flowchart explaining a sensing procedure of a multi-touchpanel of resistive type.

FIG. 5 is a flowchart explaining a sensing procedure of a multi-touchpanel of resistive type.

A variable i that specifies a drive line is reset to one (S10). A variable j that specifies a sensing line is reset to one (S12).

The drive unit 10 provides a drive voltage Vcc to a drive line i of the touch input device 110 (S14). The voltage detection unit 20 detects the output voltage Vout of a sensing line j of the touch input device 110, and the A/D conversion unit 30 analog-to-digital converts the output voltage Vout that has been detected (S16). Based on the above expression (2), the calculation and control unit 40 calculates a resistance value R of a pressure sensing resistor at the intersection (i,j) from the drive voltage Vcc and the output voltage Vout (S18). Based on the f-R curve, the calculation and control unit 40 obtains the pressure f applied to the intersection (i,j) from the resistance value R of the pressure sensing resistor (S20).

The variable j that specifies a sensing line is incremented by one (S22). If the variable j is n or below (N in S24), the step goes back to Step S14 so as to repeat Step S14 through step S22. If the variable j exceeds n (Y in S24), the variable i that specifies a drive line is incremented by one (S26). If the variable i is m or below (N in S28), the step goes back to Step S12 so as to repeat Step S12 through step S26. If the variable i exceeds m (Y in S28), the process is ended.

By such a sensing procedure, multi-touch input can be detected. Given that the number of vertical elements and the number of horizontal elements of the touch input device 110 are m and n, respectively, and that a bit resolution by the A/D conversion unit 30 is P bits, the total amount of sensed pressure data at each intersection is (m×n×P) bits per a single sample before conversion by the conversion unit 60.

Conversion by the conversion unit 60 to a dynamic range that is smaller than the resolution by the A/D conversion unit 30, for example, conversion to Q bits (Q<P), allows the amount of data, which is transmitted to the main processor 150 by the output unit 90, to be reduced to (m×n×Q) bits. For example, the amount of data will be changed to two thirds if the pressure data f is converted using a conversion table 62 that is used for conversion to the number Q of output bits, which is 8 bits, for the number P of input bits, which is 12 bits.

A transmission interface between the touch input device controller 130 and the main processor 150 is a USB (Universal Serial Bus), an SPI (System Packet Interface), an 120 (Intelligent Input/Output), or the like. Particularly, a reduction in the amount of data that is transferred has a profound effect on reducing power consumption in the case where a device in which the touch input processing apparatus 100 is implemented is a portable terminal.

In addition to simple conversion of input bits to a reduced number of output bits, sensitivity to pressure can also be adjusted by making a correction at the time of the conversion. Requirements for the sensitivity to pressure vary depending on applications. More meticulous sensing is possible by preparing, in advance, a plurality of types of correction curves that show sensitivity to pressure, by storing, in advance in a memory, a plurality of types of conversion tables 62 that show the plurality of types of correction curves in the form of tables, and by allowing the plurality of types of conversion tables 62 to be switched appropriately based on an application request. Also, by switching the conversion tables 62 according to an application, highly accurate pressure data appropriate for the application can be transmitted even when the number of bits of transfer data is reduced.

FIGS. 6A through 6D are diagrams explaining a plurality of types of conversion tables 62 for correcting data on a detected pressure f. A plurality of types of conversion tables 62 are provided depending on sensitivity to pressure and are switched by the switching unit 70.

Figure 6A:
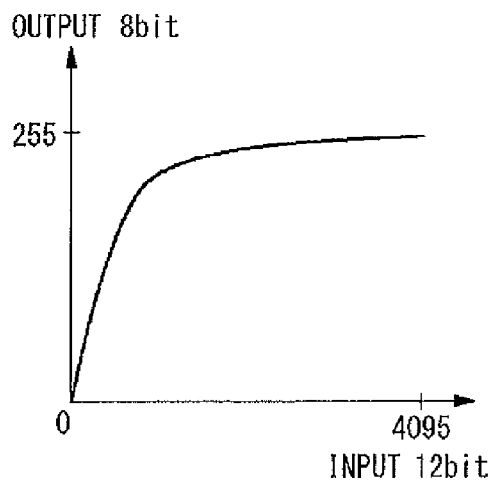
FIGS. 6A through 6D are diagrams explaining a plurality of types of conversion tables for correcting data on pressure that is detected.

FIG. 6A shows a pressure correction curve that is highly sensitive to low pressure. Since the building up of output data in response to input data occurs quickly, the value of the output data as converted becomes large even when the value of the input data is a predetermined threshold value or below. By converting pressure data according to a conversion table 62 that is based on this correction curve, data is output with high sensitivity even to slight pressure applied by a touch, such as a light touch, that is barely made. For example, in the case of selecting a button or the like on a system menu for various settings, etc., or on a menu screen shown after the start-up of a game, it is only necessary to perform switching to a conversion table 62 that is based on the pressure correction curve highly sensitive to low pressure, which is shown in FIG. 6A.

Figure 6B:
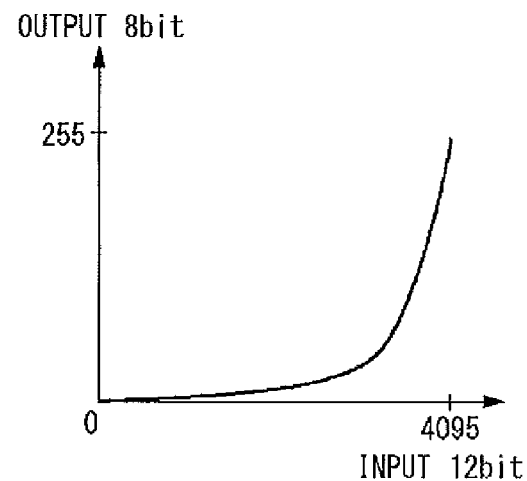

FIG. 6B shows a pressure correction curve that is highly sensitive to high pressure. Since the building up of output data in response to input data occurs slowly, the value of output data after the conversion becomes large only when the value of input data becomes a predetermined threshold value or more. For example, in the case of a hitting game where a user enters an operation with force, it is desirable that output be output only when a touch is made with high pressure. In such a case, it is only necessary to perform switching to a conversion table 62 that is based on the pressure correction curve highly sensitive to high pressure, which is shown in FIG. 6B.

Figure 6C:
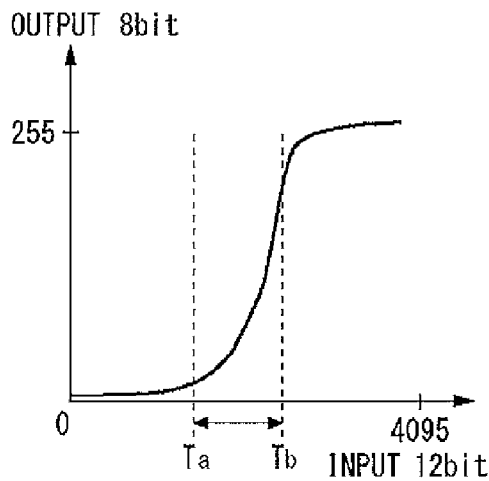

FIG. 6C shows a pressure correction curve that is highly sensitive to a specific pressure range. In this example, an output value is close to zero until an input value exceeds a given threshold value Ta, the output value increases rapidly after the input value exceeds the threshold value Ta, and the output value becomes close to the maximum value by the time the input value becomes a threshold value Tb (Tb>Ta). For example, when pressing on an accelerator of a car in a game such as a car racing game, an "allowance" is necessary where no response is given until the pressure exceeds the threshold value Ta. In such a case, it is only necessary to perform switching to a conversion table 62 that is based on the pressure correction curve highly sensitive to a specific pressure range, which is shown in FIG. 6C.

In a given exemplary embodiment, a plurality of conversion tables 62 that are based on different types of pressure correction curves are used properly in a single application.

For example, in a menu screen shown after the start-up of a game, a conversion table 62 is used that is based on the pressure correction curve highly sensitive to low pressure, shown in FIG. 6A. After the game is started, switching is performed based on a scene of the game to use a conversion table 62 that is based on the pressure correction curve highly sensitive to high pressure, which is shown in FIG. 6B, or to use a conversion table 62 that is based on the pressure correction curve highly sensitive to a specific pressure range, which is shown in FIG. 6C. By properly using a pressure correction curve suitable for a scene in a specific application, the user can have a game experience that is full of enhanced immersion and presence.

Figure 6D:
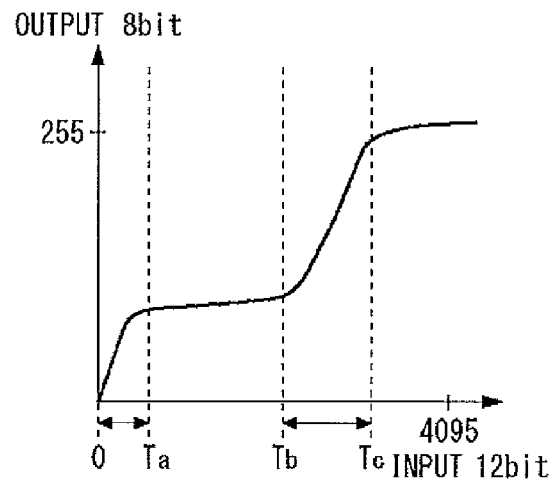

FIG. 6D shows a pressure correction curve that is highly sensitive to a multistage specific pressure range with two or more specific pressure ranges sensitive to changes in an input value. In this example, an output value changes dramatically in response to an increase in an input value in a first interval in which the input value is from zero to a first threshold value Ta and in a second interval in which the input value is from a second threshold value Tb (Tb>Ta) to a third threshold value Tc (Tc>Tb). When the input value falls in an interval from the first threshold value Ta to the second threshold value Tb, the output value changes very little in response to an increase in the input value.

The use of a conversion table 62 that is based on the pressure correction curve highly sensitive to a multistage specific pressure range, which is shown in FIG. 6D, allows for multistage inputting. For example, consideration is given regarding an operation of selecting a button displayed on a menu or the like (selection) and an operation of executing a command associated with the selected button (decision). When pressure that reaches the first threshold value Ta is detected at a part of a touchpanel where a button is displayed, it is determined that the button is being touched and focused, and a "selection" of the button is performed. The button is displayed in an enhanced manner at that time so that the user can tell that the button is being selected. When pressure that exceeds the second threshold value Tb is further detected at the same touch position at a later time, it is determined that a "decision" is made to enter the selected button, and a command associated with the button is performed.

Figure 7:
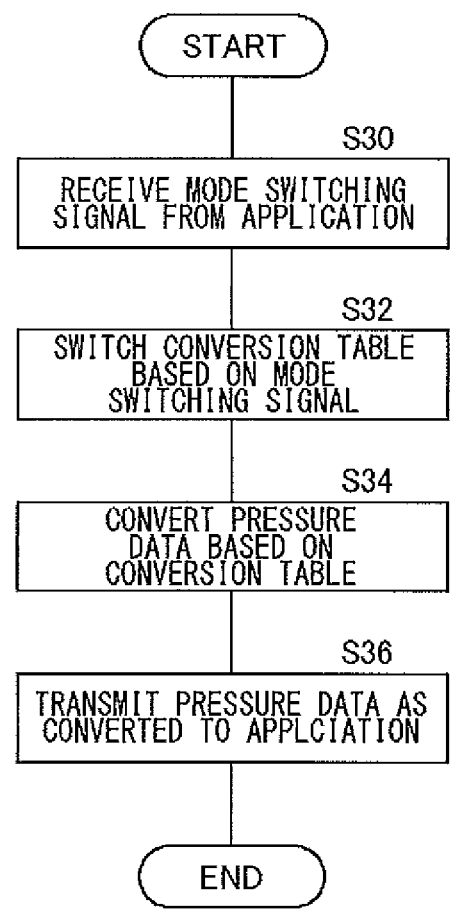
FIG. 7 is a flowchart illustrating a procedure for converting sensor output data according to the present embodiment.

FIG. 7 is a flowchart illustrating a procedure for converting sensor output data according to the present embodiment.

The switching unit 70 receives a mode switching signal from an application executed by the main processor 150 (S30). The conversion unit 60 switches a conversion table 62 to be selected based on the mode switching signal (S32). The conversion unit 60 corrects pressure data based on the conversion table 62 specified by the mode switching signal (S34). The output unit 90 transmits to the main processor 150 pressure data as converted and provides the pressure data to the application executed by the main processor 150 (S36).

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

In the above explanation, the number of bits of the pressure data f is converted. Alternatively, the number of bits of an output voltage Vout may be converted, and a resistance value R of a pressure sensing resistor at an intersection may then be obtained from the output voltage Vout as converted so as to obtain, from the resistance value R of the pressure sensing resistor, a pressure f applied to the intersection based on the f-R curve. For example, if the number of bits of the output voltage Vout is reduced from 12 bits to 8 bits in advance such that subsequent calculations are performed at 8 bits, pressure data f of 8 bits can be output.

In the above explanation, the embodiment is described using, as an example, an input device such as a touchpanel and a touch pad that requires specification of a touch point. In a device for entering some sort of input by touching the surface with a hand or the like as in the case of a grip sensor, etc., a data conversion technique according to the present embodiment can also be applied to a case where output data for sensing on the surface of an input device is converted. In the above explanation, an explanation is given of an example where detected pressure data is converted using a pressure-sensitive input device. The data conversion technique according to the present embodiment can be applied not only to an input device of a pressure-sensitive type but also to a case where detected data of some sort of sensing device is converted.

What is claimed is:

1. An input device control apparatus, comprising:
   a conversion unit configured to convert output data detected by an input device based on a conversion curve selected from among a plurality of different conversion curves, where the input device is a pressure-sensitive input device configured to produce the output data that varies as a function of pressures of touch inputs, and each of the plurality of different conversion curves has variable ordinate values as a function of pressure;
   an output unit configured to transmit the converted output data to a main processor via an interface; and
   a switching unit configured to receive, from the main processor via the interface, a mode switching signal for switching detection sensitivity,
   wherein the conversion unit switches the selected conversion curve for reference based on the mode switching signal, and
   wherein the plurality of different conversion curves include at least one pressure correction curve that is highly sensitive to low pressure, at least one pressure correction curve that is highly sensitive to high pressure, and at least one pressure correction curve that is highly sensitive to a specific pressure range.

2. The input device control apparatus according to claim 1, further comprising a bit conversion table for reducing a number of bits of the output data.

3. The input device control apparatus according to claim 1, wherein the plurality of conversion curves have different detection sensitivities.

4. The input device control apparatus according to claim 1, wherein the switching unit switches, according to the type of an application or a situation of use in a single application, the pressure correction curve that is highly sensitive to low pressure, the pressure correction curve that is highly sensitive to high pressure, and the pressure correction curve that is highly sensitive to a specific pressure range.

5. An input device control method comprising:
   converting output data detected by an input device based on a conversion curve selected from among a plurality of different conversion curves, where the input device is a pressure-sensitive input device configured to produce the output data that varies as a function of pressures of touch inputs, and each of the plurality of different conversion curves has variable ordinate values as a function of pressure;

transmitting the converted output data to a main processor via an interface, thereby outputting the output data; and receiving, from the main processor via the interface, a mode switching signal for switching detection sensitivity, wherein the converting includes switching the selected conversion curve for reference based on the mode switching signal, and wherein the plurality of different conversion curves include at least one pressure correction curve that is highly sensitive to low pressure, at least one pressure correction curve that is highly sensitive to high pressure, and at least one pressure correction curve that is highly sensitive to a specific pressure range.

6. A non-transitory computer-readable recording medium containing a computer program, which when executed by a computer causes the computer to carry out actions, comprising:

converting output data detected by an input device based on a conversion curve selected from among a plurality of different conversion curves, where the input device is a pressure-sensitive input device configured to produce the output data that varies as a function of pressures of touch inputs, and each of the plurality of different conversion curves has variable ordinate values as a function of pressure;

transmitting the converted output data to a main processor via an interface, thereby outputting the output data; and receiving, from the main processor via the interface, a mode switching signal for switching detection sensitivity, wherein the converting includes switching the selected conversion curve for reference based on the mode switching signal, and wherein the plurality of different conversion curves include at least one pressure correction curve that is highly sensitive to low pressure, at least one pressure correction curve that is highly sensitive to high pressure, and at least one pressure correction curve that is highly sensitive to a specific pressure range.

* * * * *